Dec. 19, 1922. 1,439,244
W. O. KIMMELL.
FISHING TOOL.
FILED DEC. 11, 1920. 2 SHEETS-SHEET 1
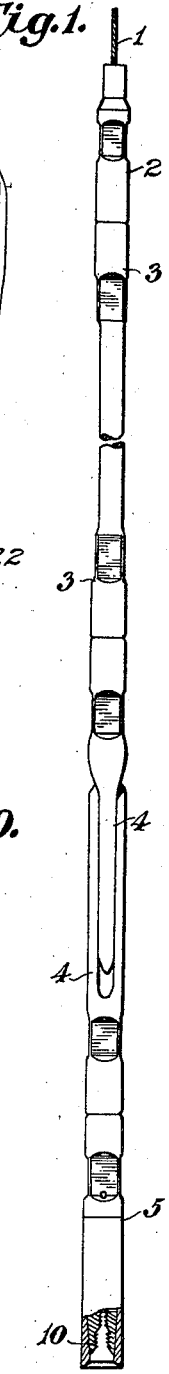
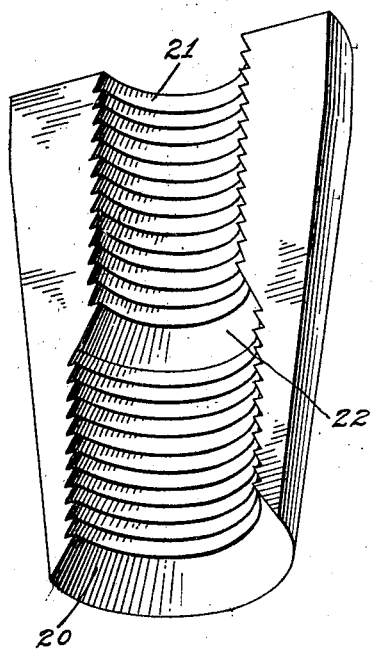
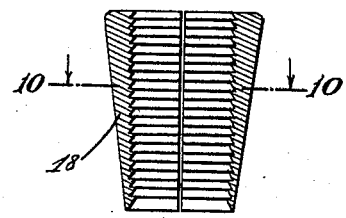
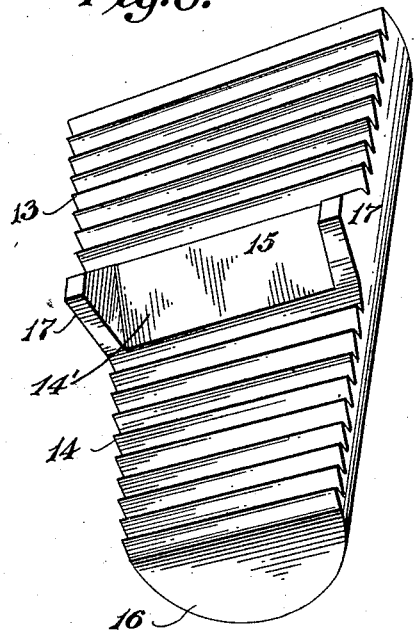
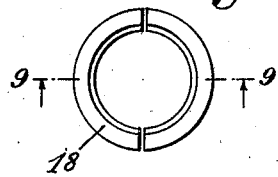
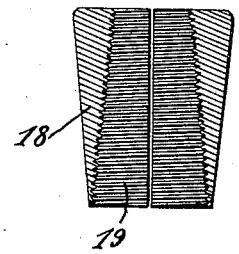
Inventor
Walter O. Kimmell
Attorneys

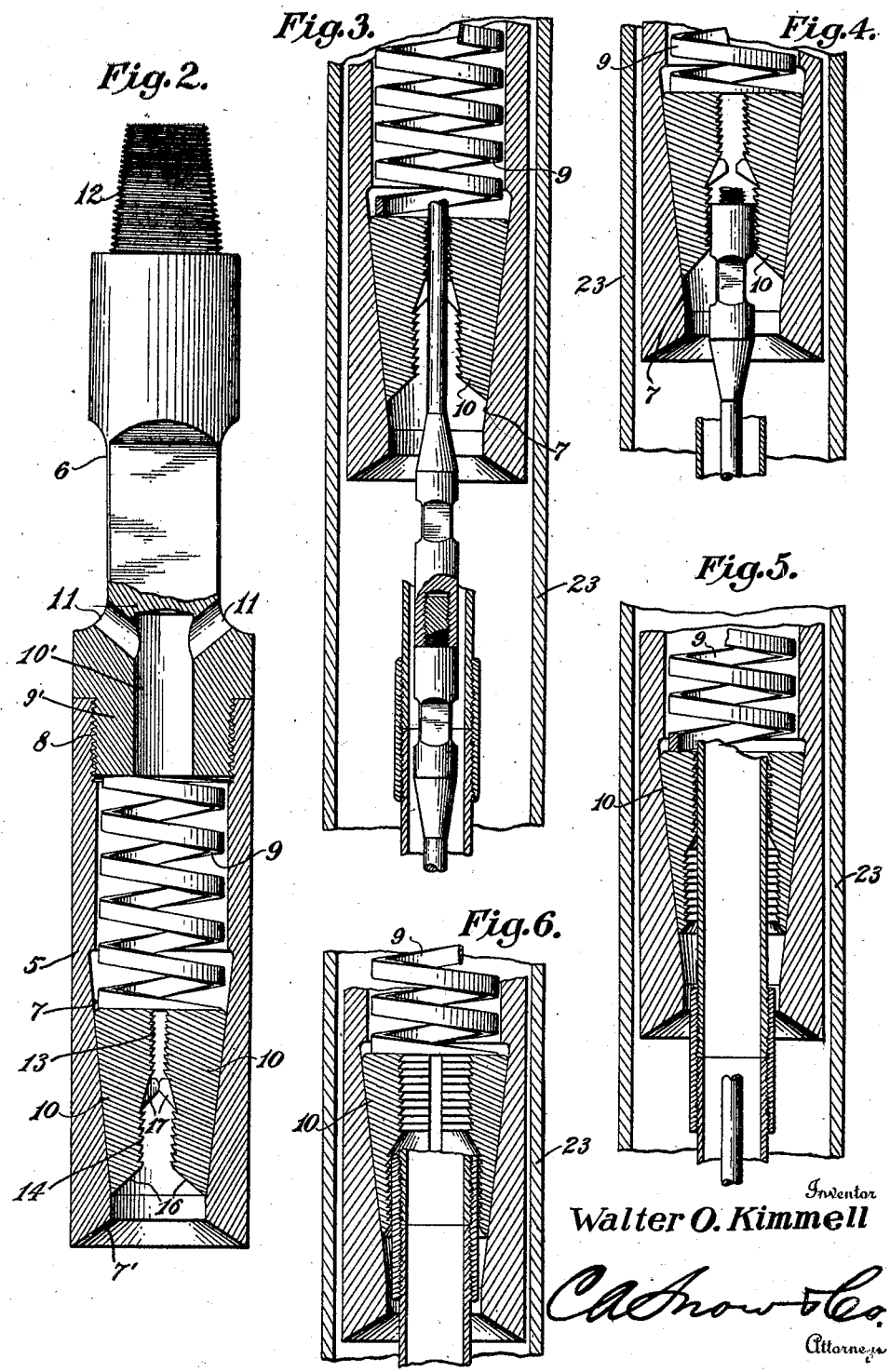

Patented Dec. 19, 1922.

1,439,244

UNITED STATES PATENT OFFICE.

WALTER O. KIMMELL, OF CARBON, TEXAS.

FISHING TOOL.

Application filed December 11, 1920. Serial No. 429,953.

*To all whom it may concern:*

Be it known that I, WALTER O. KIMMELL, a citizen of the United States, residing at Carbon, in the county of Eastland and State of Texas, have invented a new and useful Fishing Tool, of which the following is a specification.

This invention relates to well drilling apparatus and more particularly to devices commonly known as fishing tools, it being the primary object of the invention to provide a novel form of fishing tool for recovering lost parts of pumps, used in drilling wells when the same become broken and drop into the well.

A further object of the invention is to provide a tool of this character of a diameter to permit the same to move freely in the well casing, the tool being of a novel construction to grip the rod or broken element of the pump, when the tool contacts with the same.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of the device, the lower portion thereof being broken away to show the gripping jaws.

Figure 2 illustrates a longitudinal sectional view through the end of the gripping portion of the tool.

Figure 3 illustrates a fragmental vertical sectional view showing the jaws in the act of gripping a rod.

Figure 4 illustrates a fragmental vertical sectional view showing the jaws in the act of gripping a rod of a greater diameter.

Figure 5 illustrates a fragmental vertical sectional view disclosing the jaws as gripping a portion of the well tubing.

Figure 6 illustrates a fragmental sectional view showing the jaws as gripping the tubing at its connecting collar.

Figure 7 illustrates a perspective view of one of the jaws.

Figure 8 illustrates a perspective view of a modified form of gripping jaw.

Figure 9 illustrates a sectional view taken on line 9—9 of Figure 10.

Figure 10 illustrates a sectional view taken on line 10—10 of Figure 9.

Figure 11 illustrates a modified form of gripping jaws for recovering pins or tools which have dropped into the well.

Referring to the drawings in detail, the reference character 1 designates the cable or rope to which the device is attached, the same being attached to the stem 3 as by means of the rope socket 2, in the usual manner.

Having connection with the stem 3 are the jaws 4 which connect the socket member 5 thereto, the socket member 5 housing the jaws, which grasp the broken portion of the well-boring apparatus, to be recovered.

The socket member 5 is provided with an upper threaded portion 8, adapted to receive the threaded extension 9' of the shank or stem 6, which has a threaded extension 12 formed at one end thereof, and by means of which extension the socket member may be secured to the remaining portion of the tool.

Formed in the stem 6, is a central opening 10' which is in communication with the lateral openings 11 to permit the passage of fluid through the openings, when the device is being lowered into a well.

The inner wall of the socket member is inclined from the central portion thereof to a point adjacent to the lower edge of the socket member as indicated at 7, the lower edge being inclined to meet the inclined surface 7 as at 7', whereby a rod or portion of a drilling apparatus to be recovered, may be guided to the interior of the socket member, by its contact with the socket member 7.

Disposed within the socket member 5, are the gripping jaws 10 which are also provided with inclined surfaces inclined in a direction opposite to the inclinations of the inner wall of the socket member so that movement of the gripping jaws within the socket member will result in a movement of the jaws towards and away from each other to accomplish the gripping action.

Disposed between the upper ends of the gripping jaws and the lower end of the stem 6, is a coiled spring 9 which normally urges the gripping jaws 10 to the limit of their downward movements, so that the jaws may be in positions to readily grip the rod or tool to be recovered. Extensions 17 are formed substantially intermediate the ends of the jaws 10, which extensions cooperate to hold the jaws a predetermined distance apart causing the jaws to readily grip the article under operation.

The lower extremity of each jaw 10 is inclined as at 16 to guide the rod or tool under operation to the jaws, whereby the weight of the tool will cause the jaws to move within the socket member a distance to permit the rod to be gripped by the jaws.

In the modified form of gripping jaws as illustrated by Figure 10, the jaws are formed with a standard taper or pitch and cross section, as illustrated at 18, corresponding to the pitch or taper on which all pins or tools are made, the jaws as shown in this figure being especially designed for recovering tools, pins or the like.

It might be further stated however that the inner surfaces of the jaws are formed with teeth as indicated at 19, which teeth bite into the surfaces of the device to be recovered to prevent slipping of the device from the jaws.

The inner surfaces of the jaws 10 are also provided with teeth 13 and 14, the teeth being separated by a relatively smooth inclined surface 14' so that articles of smaller diameter may be guided to the teeth 13 to cause the jaws to grip the same.

In the form of the invention as illustrated by Figure 7 of the drawings, the jaws are semi-circular in formation, this particular form of jaw being designed for gripping round objects, and as shown, the form of jaw is also provided with teeth 20 and teeth 21, which teeth are separated by relatively smooth surfaces 22, whereby the object may be guided to the lower teeth 20 and to the upper teeth 21.

In the operation of the device, it is obvious that when the tool is dropped into a well casing, which in the present drawings is illustrated by the reference character 23, the jaws, upon contacting with the rod or object to be recovered, move upwardly within their socket members and adjust themselves to the proper diameter of the rod being recovered, whereupon an upward pull on the tool causes the teeth of the jaws to bite into the surfaces of the article under operation, the coiled spring 9 operating to eliminate any possibility of the jaws releasing their hold on the object.

The device may now be withdrawn from the well casing, carrying with it the rod or object to be removed.

Having thus described the invention, what is claimed as new is:—

In a device of the character described, a socket member, said socket member having an inclined wall and having an inclined lower surface to cam an article to the interior of the socket member, opposed gripping jaws disposed within the socket member and engaging the inclined wall thereof, lateral extensions formed integral with the jaws and disposed intermediate the ends thereof, the lateral extensions of the jaws adapted to contact to normally hold the jaws in spaced relation, teeth on the jaws and said jaws having inclined smooth surfaces intermediate the ends thereof.

In testimony that I claim the foregoing as my own, I have hereto affixed my signature in the presence of two witnesses.

WALTER O. KIMMELL.

Witnesses:
S. W. SMITH,
P. J. STARK.